(12) United States Patent
Kogami

(10) Patent No.: US 8,127,962 B2
(45) Date of Patent: Mar. 6, 2012

(54) LID OPENING AND CLOSING DEVICE FOR OPENING AND CLOSING AN OPENING OF A HOUSING BY A LID

(75) Inventor: Mitsuru Kogami, Utsunomiya (JP)

(73) Assignee: NIFCO Inc., Yokohama-Shi, Kanagawa-Ken (JP)

( * ) Notice: Subject to any disclaimer, the term of this patent is extended or adjusted under 35 U.S.C. 154(b) by 38 days.

(21) Appl. No.: 12/450,628

(22) PCT Filed: Apr. 4, 2008

(86) PCT No.: PCT/JP2008/000873
§ 371 (c)(1),
(2), (4) Date: Dec. 4, 2009

(87) PCT Pub. No.: WO2008/126397
PCT Pub. Date: Oct. 23, 2008

(65) Prior Publication Data
US 2010/0102064 A1 Apr. 29, 2010

(30) Foreign Application Priority Data
Apr. 5, 2007 (JP) .................. 2007-099018

(51) Int. Cl.
*B65D 43/20* (2006.01)
*B65D 45/16* (2006.01)
*B65D 90/62* (2006.01)
*B60R 7/06* (2006.01)

(52) U.S. Cl. ........ 220/348; 220/326; 220/812; 220/815; 224/483; 224/542; 292/169.11; 296/37.12; 312/139.1; 312/328

(58) Field of Classification Search .................. 220/324, 220/326, 348, 811, 812, 815, 816; 224/281, 224/282, 483, 539, 542, 545; 292/169.11, 292/170; 296/37.12, 37.8, 37.9; 312/139.1, 312/326–329
See application file for complete search history.

(56) References Cited

U.S. PATENT DOCUMENTS

| | | | | |
|---|---|---|---|---|
| 4,260,069 A * | 4/1981 | Juergens | ...................... | 220/812 |
| 4,555,045 A * | 11/1985 | Rodth et al. | ...................... | 222/1 |
| 5,092,484 A * | 3/1992 | Daugherty et al. | ........... | 220/812 |
| 5,520,313 A * | 5/1996 | Toshihide | ...................... | 224/539 |
| 5,639,002 A * | 6/1997 | Weitbrecht et al. | ........... | 224/539 |
| 5,673,811 A * | 10/1997 | Dickinson et al. | ............ | 220/812 |
| 6,129,237 A * | 10/2000 | Miyahara | ...................... | 220/812 |
| 6,669,258 B1 * | 12/2003 | Kato | ........................... | 296/1.01 |
| 6,783,166 B2 * | 8/2004 | Kato | ......................... | 296/37.12 |
| 7,025,225 B2 * | 4/2006 | Inari | ........................... | 220/830 |
| 7,225,957 B2 * | 6/2007 | Kogami | ....................... | 224/483 |

(Continued)

FOREIGN PATENT DOCUMENTS
JP    H04-34143 U    3/1992
(Continued)

*Primary Examiner* — J. Gregory Pickett
*Assistant Examiner* — Ned A Walker
(74) *Attorney, Agent, or Firm* — Manabu Kanesaka

(57) ABSTRACT

A lid body is constituted so as to enable to selectively take a lid closing preparation position wherein the lid body is moved forward to a housing frontward side with an approximately horizontal condition and projects to a housing front, a lid closed position closing an opening portion of a housing with an approximately vertical condition, and a lid open position wherein the lid body is moved to a housing backward side with an approximately horizontal condition.

9 Claims, 14 Drawing Sheets

U.S. PATENT DOCUMENTS

| | | | |
|---|---|---|---|
| 7,231,692 B2 * | 6/2007 | Harada | 16/345 |
| 7,487,884 B2 * | 2/2009 | Kim | 220/827 |
| 7,568,601 B2 * | 8/2009 | Kogami et al. | 224/483 |
| 2003/0071047 A1 * | 4/2003 | Harada | 220/835 |
| 2003/0080131 A1 * | 5/2003 | Fukuo | 220/264 |
| 2003/0178434 A1 * | 9/2003 | Kato | 220/811 |
| 2004/0020935 A1 * | 2/2004 | Inari | 220/830 |
| 2004/0140675 A1 * | 7/2004 | Kogami | 292/1 |
| 2005/0000991 A1 * | 1/2005 | Kogami | 224/483 |
| 2005/0133523 A1 * | 6/2005 | Kim | 220/827 |
| 2006/0027617 A1 * | 2/2006 | Kogami et al. | 224/483 |
| 2006/0054630 A1 * | 3/2006 | Katagiri | 220/830 |

FOREIGN PATENT DOCUMENTS

| | | |
|---|---|---|
| JP | H07-172245 A | 7/1995 |
| JP | 2002-213138 A | 7/2002 |
| JP | 2003-161073 A | 6/2003 |
| JP | 2005-306225 A | 11/2005 |
| JP | 2006-290163 A | 10/2006 |

* cited by examiner

LID OPENING AND CLOSING DEVICE FOR OPENING AND CLOSING AN OPENING OF A HOUSING BY A LID

FIELD OF THE INVENTION

This invention relates to a lid opening and closing device, especially, a manual type opening and closing device for a lid body (lid) of a storing case or a housing of a vehicle interior equipment disposed in a center console, an instrument panel or the like for an automobile.

BACKGROUND OF THE ART

As for an opening and closing device for a lid body of a storing case or a vehicle interior equipment disposed in a vehicle interior of an automobile as an accessory box and the like, there are some devices structured as follows. One device with a simple frontward-falling type is structured such that a front lid is attached by a lower part hinge with a horizontal hinge axis; opens and closes by turning the front lid as a center of the hinge axis of the lower part hinge; and is held in a closed lid position by a latch mechanism with an alternate type of push-lock and push-open movements (for example, Japanese Patent Document 1). Another device is structured such that the lid body (door body) is connected to a slider; due to a horizontal movement of the slider, enables to move between the closed lid position of an approximately vertical condition and an open lid position which is raised to an approximately horizontal condition; is urged in an opening lid direction by a spring; and is held in the closed lid position by the latch mechanism with the alternate type of the push-lock and push-open movements (for example, Japanese Patent Document 2).
Patent Document 1: Japanese Unexamined Patent Application Publication (TOKKAI) No. 2002-213138
Patent Document 2: Japanese Unexamined Patent Application Publication (TOKKAI) No. 2005-306225

DISCLOSURE OF THE INVENTION

Problems to be Solved by the Invention

As for an opening and closing device for a lid body which is disposed in a vehicle interior of an automobile and the like, a whole lid body whose lid is open is stored in a deep inner side of a design surface comprising a front face of a center console and the like, for example, in a horizontal condition, so that the lid body does not lie in the way. Also, there is a request for hiding the lid body in an open lid state, and providing a flat surface so as to improve a design property.

In contrast, although a conventional lid body opening and closing device can selectively take two positions of an open lid position and a closed lid position, and functions usefully as a lid body device, as for the one with a manual type, if the whole lid body is stored in the deep inner side of the design surface, it becomes difficult to grab the lid body with one's fingertips, so that a lid closing operation from the open lid state becomes difficult. Consequently, as for the conventional lid body opening and closing device, it is difficult to provide both a design property and operability at the same time.

A subject that the present invention tries to solve is to provide a lid body opening and closing device which excels in both the design property and operability as well as an appealing appearance with a variety of tastes.

Means for Solving the Problems

A lid body opening and closing device according to the present invention is an opening and closing device for a lid body which opens and closes an opening portion formed in a front face portion of a housing. The lid body opening and closing device includes a first slider movably provided in said housing in a front-back direction; a second slider movably provided in said housing in the front-back direction, and connected to said lid body; a first spring member provided between said housing and said first slider and urging said first slider to a housing frontward side; a second spring member provided between said first slider and said second slider, and urging said second slider to a housing backward side; a first latch device releasably locking said first slider in a housing backward position relative to said housing; and a second latch device releasably locking said second slider in a housing frontward position relative to said housing. Said lid body can selectively take a closed lid position which blocks said opening portion with an approximately vertical condition; an open lid stored position wherein by releasing the locking of said second slider by said second latch device, said second slider moves to the housing backward side by a spring force of said second spring member, and said lid body turns approximately 90 degrees from the approximately vertical condition, is positioned in an approximately horizontal condition, and moves to the housing backward side with the approximately horizontal condition; and a closing lid preparation position wherein by releasing the locking of said first slider by said first latch device, said first slider moves to the housing frontward side by the spring force of said first spring member, and with said second slider, said first slider moves forward to the housing frontward side with the approximately horizontal condition, and projects to a housing front.

Also, the lid body opening and closing device according to the present invention is the opening and closing device for the lid body which opens and closes the opening portion formed in the front face portion of the housing. The lid body opening and closing device includes the first slider movably provided in said housing in the front-back direction; the second slider movably provided in said housing in the front-back direction, and connected to said lid body; the first spring member provided between said housing and said first slider and urging said first slider to the housing frontward side; the second spring member provided between said first slider and said second slider, and urging said second slider to the housing backward side; arm members integrally provided respectively on both right and left sides of said lid body; the first latch device releasably locking said first slider in the housing backward position relative to said housing; and the second latch device releasably locking said second slider in the housing frontward position relative to said housing. In both side portions of said housing, a first guide rail portion extending in a linear fashion in a front-back horizontal direction of said housing; and a second guide rail portion comprising a circular arc portion and a horizontal linear portion extending in the linear fashion in the front-back horizontal direction of said housing and continuing to an end portion of said circular arc portion, are formed. In said arm members, a first engaging element movably engaging said first guide rail portion; and a second engaging element movably engaging said second guide rail portion, are provided. Said lid body is positioned in the closed lid position which blocks said opening portion with the approximately vertical condition. By releasing the locking of said second slider by said second latch device, said second slider moves to the housing backward side by the spring force of said second spring member. Due to this movement, said second engaging element moves by being guided by said circular arc portion of said second guide rail portion so that said lid body in the closed lid position turns approximately 90 degrees as a rotational center of said first engaging element, and is positioned in the approximately horizontal condition, so that the lid is opened. Further on, additionally, said first engaging element is guided by said first guide rail portion, and also said second engaging element is guided by said horizontal linear portion of the second guide rail portion so that the first engaging element and the second engaging element respectively move to the housing backward side. Accordingly, said lid body moves to the housing backward side with the approximately horizontal condition and is positioned in the open lid stored position. In a state wherein said lid body is positioned in said open lid stored position, the locking of said first slider by said first latch device is released, so that said first slider moves to the housing frontward side with said second slider by the spring force of said first spring member. Due to this movement, said first engaging element is guided by said first guide rail portion, and said second engaging element is guided by said horizontal linear portion of said second guide rail portion, so that the first engaging element and the second engaging element respectively move to the housing frontward side. Accordingly, said lid body is positioned in the closing lid preparation position wherein said lid body moves forward to the housing frontward side with the approximately horizontal condition, and projects to the housing front.

As for the lid body opening and closing device according to the present invention, preferably, said lid body in said closing lid preparation position is returned to the approximately vertical condition from the approximately horizontal condition, so that said first slider returns to the housing backward position against the spring force of said first spring member, and is locked relative to said housing by said first latch device. Also, said second slider returns to the housing frontward position against the spring force of said second spring member, and is locked relative to said housing by said second latch device. Accordingly, said lid body is locked in said closed lid position.

As for the lid body opening and closing device according to the present invention, preferably, said first latch device and said second latch device are respectively constituted by a latch mechanism with an alternate type of push-lock and push-open movements, and a pushing operation is performed by pushing a press button provided in said lid body or a front face portion of said housing.

As for the lid body opening and closing device according to the present invention, preferably, an accessory panel is disposed in front of said housing. In the accessory panel, a penetration opening wherein said lid body in said closed lid position is fitted together and disposed, is formed. Said whole lid body in said open lid stored position is stored at the back of the accessory panel, and in said closing lid preparation position, said lid body projects to the front of said accessory panel and is exposed.

As for the lid body opening and closing device according to the present invention, preferably, a flapper which opens and closes a slit-like opening portion formed in order to take said lid body in and out of said open lid stored position, is turnably provided between said housing and a border portion of said penetration opening of said accessory panel. Said flapper is urged to a closing position side by a spring and abuts against said lid body. With the movement of said lid body to said open lid stored position, said flapper turns to a closing position due to the spring force of said spring, and said lid body is moved to said closed lid position so that said lid body turns to an opening position against the spring force of said spring.

Effects of the Invention

As for the lid body opening and closing device according to the present invention, due to slide operations of two sliders of the first slider and the second slider; and latch and latch release operations of two latch devices of the first latch device and the second latch device, the lid body can selectively take a closing lid preparation position wherein the lid body moves forward to a housing frontward side with an approximately horizontal condition and projects to a housing front, in addition to a closed lid position blocking an opening portion of a housing with an approximately vertical condition; and an open lid stored position wherein the lid body moves to a housing backward side with the approximately horizontal condition. As a result, in the open lid stored position, the whole lid body is stored in a deep inner side of a design surface by an accessory panel so as to have a flat surface, and in the closing lid preparation position, the lid body projects to the front of said accessory panel and is exposed, so that with a projecting and exposed portion thereof, the closing operation of the lid body can be performed. Thereby, an appealing appearance and both an excellent design property and operability can be achieved.

Also, an opening movement of the lid body from the closed lid position to the open lid stored position is automatically performed by the spring force of the first spring member only by a latch release of the first latch device. The movement of the lid body from the open lid stored position to the closing lid preparation position is automatically performed by the spring force of the second spring member only by the latch release of the second latch device. Accordingly, a user is just required to move the lid body from the closing lid preparation position to the closed lid position, so that the lid body becomes user-friendly, excels in the level of safety, and also provides variety of tastes.

BEST MODE FOR CARRYING OUT THE INVENTION

A lid body opening and closing device according to the present invention is used as an opening and closing device for a lid body (lid) 10 of a pocket for an accessory box embedded in a center console 100 in a passenger vehicle, for example, as shown in FIG. 1.

FIGS. 2 to 12 show an embodiment 1 of the lid body opening and closing device according to the present invention. In these figures, the reference numeral 20 represents a housing defining an accessory storage chamber 21 such as a pocket for an accessory box and the like. A front face portion of the housing 20 is a short opening portion 22 for taking out and putting in goods relative to the accessory storage chamber 21.

In front of the housing 20, an accessory panel 101 is disposed. In the accessory panel 101, a short penetration opening 102 which is positioned in front (near side) of the opening portion 22 of the housing 20 and wherein the lid body 10 in a closed lid position fits together and is disposed, is formed. The lid body 10 has a short plate shape slightly shorter than the penetration opening 102 of the accessory panel 101, and with the opening and closing of the opening portion 22 of the housing 20, the penetration opening 102 of the accessory panel 101 opens and closes.

On the upper surface of the housing 20, a plate-like base member 23 is fixed and placed. On the housing 20, a first slider 41 and a second slider 42 are individually and movably provided in a front-back direction of the housing 20, respectively.

The first slider 41 has a staple shape and is disposed so as to cross over the upper side of the housing 20. The first slider 41 is guided by a linear guide rail portion 24 in a front-back direction formed on both right and left side surfaces of the housing 20, and slidably moves in the front-back direction of the housing 20. The second slider 42 has a shape of a strip of paper, and is guided by a linear guide rail portion 25 in the front-back direction formed in both right and left side border portions of the base member 23 so as to slidably move in the front-back direction of the housing 20. The first slider 41 and the second slider 42 are provided with a different height, and the second slider 42 can slide into the downside of the first slider 41.

On the base member 23, a roll portion 26A of a first Conston (constant force) spring 26 is attached. A fore-end portion 26B of the first Conston spring 26 is locked in the first slider 41. Specifically, the first Conston spring 26 is provided between the housing 20 and the first slider 41, and urges the first slider 41 to a housing frontward side.

On the first slider 41, a roll portion 27A of a second Conston spring 27 is attached. A fore-end portion 27B of the second Conston spring 27 is locked in the second slider 42. Specifically, the second Conston spring 27 is provided between the first slider 41 and the second slider 42, urges the second slider 42 to a housing backward side, and urges the first slider 41 to the housing backward side.

On the upper surface portion of the housing 20, a rack 28 is formed parallel to the linear guide rail portion 25. On the second slider 42, a rotary damper 29 is attached. In a rotational axis of the rotary damper 29, a pinion (not shown in the figures) engaging the rack 28 is provided. Due to this rack and pinion engagement, the rotary damper 29 provides a resistance to a front-back directional movement of the second slider 42 due to a damper operation, and sets a moving speed in the front-back direction of the second slider 42, especially, the moving speed to the housing backward side due to a spring force of the second Conston spring 27 at a relatively slow speed.

In the first slider 41 and the housing 20, a first latch device (lock device) 43 releasably locking the first slider 41 to the housing backward position (see FIGS. 6, 7) relative to the housing 20, is provided. The first latch device 43 is constituted by a latch mechanism with an alternate type of a heretofore known heart cam system which performs push-lock and push-open movements, and the first slider 41 is pushed to a deep inner side (left sides in FIGS. 6, 7) by the lid body 10 or a press button 32 provided in the front face portion of the housing 20, so that a pushing operation is performed, and locking and unlocking are alternately repeated.

The press button 32, as shown in FIG. 8, is provided in the housing 20 so as to enable to move the upper surface in the front-back direction, and by being pushed with one's fingertips, the lid body 20 moves to a left direction (deep inner direction) against a spring force of a compression coil spring 33. With this, an operating element 34 is guided by an inclined cam surface 35 so as to rise and move forward. Accordingly, the operating element 34 abuts against an engaging portion 44 of a lower bottom surface portion of the first slider 41, and pushes the first slider 41 to the left direction, so that the pushing operation is performed on the first latch device 43. Incidentally, a mechanism wherein the first slider 41 is pushed in the left direction since a lower end side of the lid body 10 is pushed so that a pushing operation of the first latch device 43 is performed, will be described hereinafter.

In the second slider 42 and the housing 20, a second latch device (lock device) 45 releasably locking the second slider 42 in a housing frontward position (see FIGS. 6, 7) relative to the housing 20, is provided. The second latch device 45 is constituted by the latch mechanism with the alternate type of the heretofore known clamp claw system which performs the push-lock and push-open movements, and when the second slider 42 is pushed to the near side (right sides viewed in FIGS. 6, 7) by the lid body 10, the pushing operation is performed on the second latch device 43, and locking and unlocking are alternately repeated.

The lid body 10 is connected to the second slider 42 by a right-and-left pair of link members 14 whose ends are pivotally connected to the second slider 42 by a pivot axis 11, and whose other ends are pivotally connected to brackets 13 integrally provided on a reverse surface side of the lid body 10 by a pivot axis 12 so as to enable to turn around a horizontal axis line.

In both side portions of the housing 20, respectively, a first guide rail portion 30 extending in an approximately linear fashion in a front-back horizontal direction of the housing 20; and a second guide rail portion 31 comprising a circular arc portion 31A in an approximately up-down direction and horizontal linear portion 31B extending in a linear fashion in an approximately front-back horizontal direction of the housing 20 and continuing to a lower end portion of the circular arc portion 31A, are formed.

In both right-and-left sides of the lid body 10, arm portions 15 are integrally provided respectively. In the arm member 15, a first engaging element 16 slidably engaging the first guide rail portion 30; and a second engaging element 17 slidably engaging the second guide rail portion 31, are provided. The first engaging element 16 is positioned on a base portion side (right side viewed in FIG. 7) of the arm member 15, and the second engaging element 17 is positioned on an end side of the arm member 15.

In the end portions of the arm portions 15, pressing elements 18 are provided. The pressing elements 18 abut against vertical front faces 47 of right-and-left leg portions 46 of the first slider 41, and a closing lid movement (turning in a clockwise direction viewed in FIGS. 7, 12) of the lid body 10 is transmitted as the movement in a direction of returning to the first slider 41. Also, the lid body 10 in a horizontal condition (see FIG. 10) is pushed to the deep inner side with one's fingertips, so that the pressing elements 18 push the first slider 41 in the left direction and the pushing operation is performed on the first latch device 43.

Plate springs 48 are attached to the leg portions 46 of the first slider 41. The plate springs 48 abut against the pressing elements 18 of the lid body 10 in the closed lid position (see FIG. 7), and when the lower end side of the lid body 10 in the closed lid position (see FIG. 7) is pushed by one's fingertips, the plate springs 48 provide the feel of a moderate rebound relative to the operation.

In a front end upper border portion of the housing 20, a horizontally long and short flapper 37 is turnably provided by a pivot axis 36. The flapper 37 is used for opening and closing a horizontally long, short, and slit-like opening portion 103 (see FIG. 10) provided between the upper side of the housing 20 and an upper border portion 102A of the penetration opening 102 of the accessory panel 101 in order to take out and put in the lid body 20 in the open lid stored position of the lid body 20 ensured on the upper side of the housing 20.

The flapper 37 is urged to a closing position side (counter-clockwise direction viewed in FIG. 7) by a torsion spring 38, abuts against the lid body 10, and follows opening and closing movements of the lid body 10. Briefly, with the movement of the lid body 10 to the open lid stored position, the flapper 37 turns to the closed position (see FIG. 10) due to the spring force of the torsion spring 38, and the lid body 10 is moved to the closed lid position, so that the flapper 37 is pushed by the lid body 10 and turns to an open position (see FIG. 7) against the spring force of the torsion spring 38. The flapper 37 in the open position is hidden on a reverse face side of the lid body 10 viewed from an obverse side of the lid body 10 as shown in FIG. 7.

Next, the opening and closing movements of the lid body 10 will be explained.

As shown in FIGS. 2, 7, the lid body 10 fits together into the penetration opening 102 of the accessory panel 101 with an approximately vertical condition, and in a flat surface condition, the lid body 10 closes this, and at the same time, is positioned in the closed lid position blocking the opening portion 22 of the housing 20.

As shown in FIGS. 6 to 8, the closed lid position of the lid body 10 is obtained after the first slider 41 is locked in the housing backward position relative to the housing 20 by the first latch device 43 and the second slider 42 is locked in the housing frontward position relative to the housing 20 by the second latch device 45. In this closed lid position, the plate springs 48 push the pressing elements 48 from above so that the lid body 10 never wobbles to the deep inner side.

When a lower end portion (a push mark portion 10A in FIG. 2) of the lid body 10 in the closed lid position is lightly pushed by one's fingertips, the lid body 10 turns slightly in the clockwise direction (viewed in FIG. 7) against the spring force of the plate springs 48, and the second slider 42 which is linked and connected to this is pulled to the near side. Thereby, the locking of the housing frontward position of the second slider 42 by the second latch device 45 is released.

When one's fingertips are released from the lid body 10, the second slider 42 slides and moves to the housing backward side by the spring force of the second Conston spring 27.

Due to this movement of the housing backward side of the second slider 42, at first, while the second engaging element 17 is guided by the circular arc portion 31A of the second guide rail portion 31 and moves, the lid body 10 in the closed lid position pops up approximately 90 degrees as a rotational center of the first engaging element 16, turns, and becomes the approximately horizontal condition. Thereby, the lid body 10 opens the penetration opening 102 of the accessory panel 101, frees the opening portion 22 of the housing 20, and opens the lid.

Continuously, the second slider 42 slides and moves to the housing backward side, so that the first engaging element 16 is guided by the first guide rail portion 30, and the second engaging element 17 which has reached the lower end of the circular arc portion 31A of the second guide rail portion 31 is guided by the horizontal linear portion 31B of the second guide rail portion 31. Accordingly, the first engaging element 16 and the second engaging element 17 respectively move to the housing backward side. Thereby, the lid body 10 horizontally moves to the housing backward side at the upper side of the housing 20 with the approximately horizontal condition, and is positioned in the open lid stored position shown in FIGS. 9, 10.

As for this movement of the lid body 10 from the closed lid position to the open lid stored position, a moving speed of the second slider 42 to the housing backward side is restricted by the damper operation of the rotary damper 29, so that the movement can be performed at a slow speed and with a slow heavy feeling.

The whole lid body 10 is stored at the back (deep inner side) of the accessory panel 101 in the open lid stored position. Also, the flapper 37 turns to the closed position due to the spring force of the torsion spring 38, abuts against an end portion of the lid body 10, and closes the slit-like opening portion 103.

Thereby, as shown in FIG. 3, in a storage of the lid body 10, the flat surface can be achieved. Also, due to the flapper 37, a storage portion of the lid body 10 is hidden, so that an excellent design property and appealing appearance can be provided.

In a state wherein the lid body 10 is in the above-mentioned open lid stored position, when the press button 32 is pushed with one's fingertips, or the lid body 10 is pushed through a closed positioned flapper 37, the locking of a housing backward position of the first slider 41 by the first latch device 43 is released. Due to this locking release, the first slider 41 moves to a housing frontward side with the second slider 42 by the spring force of the first Conston spring 26.

Due to this movement, the first engaging element 16 is guided by the first guide rail portion 30, and the second engaging element 17 is guided by the horizontal linear portion 31 of the second guide rail portion 31, and the first engaging element 16 and the second engaging element 17 respectively move to the housing frontward side. As shown in FIGS. 4, 11, 12, while the lid body 10 is pushed to open the flapper 37 keeping the approximately horizontal condition of the open lid storage, the lid body 10 moves forward to the housing frontward side and is positioned in a closing lid preparation position projecting in front of the housing 20.

In this closing lid preparation position, the lid body 10 in the approximately horizontal condition projects to the front (near side) of the accessory panel 101 only for a predetermined volume and is exposed. The lid body 10 in this state functions as a canopy, and an effective canopy blocking sunlight from entering to a display panel in such a case wherein the lid body 10 is the lid of the display panel of a navigator and the like.

This movement of the lid body 10 from the open lid stored position to the closing lid preparation position is also performed at a slow speed and with a slow heavy feeling since the moving speed of the second slider 42 to the housing frontward side is restricted by the damper operation of the rotary damper 29.

In the case that a closed lid is required, among the lid body 10 in the closing lid preparation position, a portion projecting and exposed in front of the accessory panel 101 is pushed downwardly by a hand operation, and the lid body 10 is returned to the approximately vertical condition from the approximately horizontal condition.

Due to this operation, the first slider 41 returns to the housing backward position against the spring force of the first Conston spring 27, and is locked in the housing backward position against the housing 20 by the first latch device 43. The second slider 42 returns to the housing frontward position against the spring force of the second Conston spring 28, and is locked in the housing frontward position against the housing 20 by the second latch device 45. Thereby, forces are stored in the first Conston spring 27 and the second Conston spring 28, and also the lid body 20 is locked in an original closed lid position.

As mentioned above, in the lid body opening and closing device of the present embodiment, due to slide operations of two sliders of the first slider 1 and the second slider 42, and latch and latch release operations of two latch devices of the first latch device 43 and the second latch device 45, the lid body 10 can selectively take the closing lid preparation position which is moved forward to the housing frontward side with the approximately horizontal condition and projects to a housing front, in addition to the closed lid position blocking the opening portion 22 of the housing 20 with the approximately vertical condition; and the open lid stored position which is moved to the housing backward side with the approximately horizontal condition. As a result, in the open lid stored position, the whole lid body is stored in the deep inner side of the design surface by the accessory panel 101 so as to have the flat surface, and in the closing lid preparation position, the lid body 10 projects to the front of the accessory panel 101 and is exposed, so that with the projecting and exposed portion thereof, a closing operation of the lid body 10 can be performed. Thereby, the appealing appearance and both the excellent design property and operability can be provided.

Also, an opening movement of the lid body 10 from the closed lid position to the open lid stored position is automatically performed by the spring force of the first Conston spring 27 only by a latch release of the first latch device 43, and the movement of the lid body 10 from the open lid stored position to the closing lid preparation position is automatically performed by the spring force of the second Conston spring 27 only by the latch release of the second latch device 45. Accordingly, a user is just required to move the lid body 10 from the closing lid preparation position to the closed lid position, so that the lid body 10 becomes user-friendly, and provides variety of tastes. Since the returning of the lid body 10 to the closed lid position is performed by the hand operation of the user, the potential for catching a finger when the lid is closed is decreased compared to the case wherein the lid is closed due to the spring forces produced only by a button operation, and the level of safety improves.

In the embodiment 1, the rotational center of the lid body 10 is positioned on the upper side of the housing 20, and the lid body 10 opens with a pop-up type; however, in the lid body opening and closing device of the present invention, as an embodiment 2, as shown in FIGS. 13 to 22, one wherein the rotational center of the lid body 10 is positioned on the lower side of the housing 20 and the lid body 10 opens with a frontward-falling type, can be applied in a similar fashion.

In this case, the embodiment 1 and the embodiment 2 can be substantially constituted in the same fashion only by reversing the top and bottom. Therefore, in FIGS. 13 to 22 showing the embodiment 2, portions which correspond to FIGS. 2 to 12 showing the embodiment 1 are provided with same symbols as symbols provided in FIGS. 2 to 12, and the explanation thereof is omitted.

In the embodiment 2, due to the reverse of the top and bottom, the lid body 10 in the open lid stored position functions as a tray. Also, in the embodiment 2, the press button 32 is omitted, and by pushing the lid body 10 in the open lid stored position to the deep inner side, the latch of the first latch device 43 is released and the lid body 10 is moved to the closing lid preparation position.

Also, the embodiment 1 and the embodiment 2 are rotated 90 degrees around the horizontal axis line, and the condition of the lid body 10 can be the approximately horizontal condition at the closed lid position, and the approximately vertical condition at the open lid stored position and the closing lid preparation position as well. In the embodiment 1 and the embodiment 2, the conditions of the lid body 10 are presented as the approximately horizontal condition at the closed lid position, the approximately horizontal condition at the open lid stored position and the closing lid preparation position for convenience of explanation.

Figure 1:
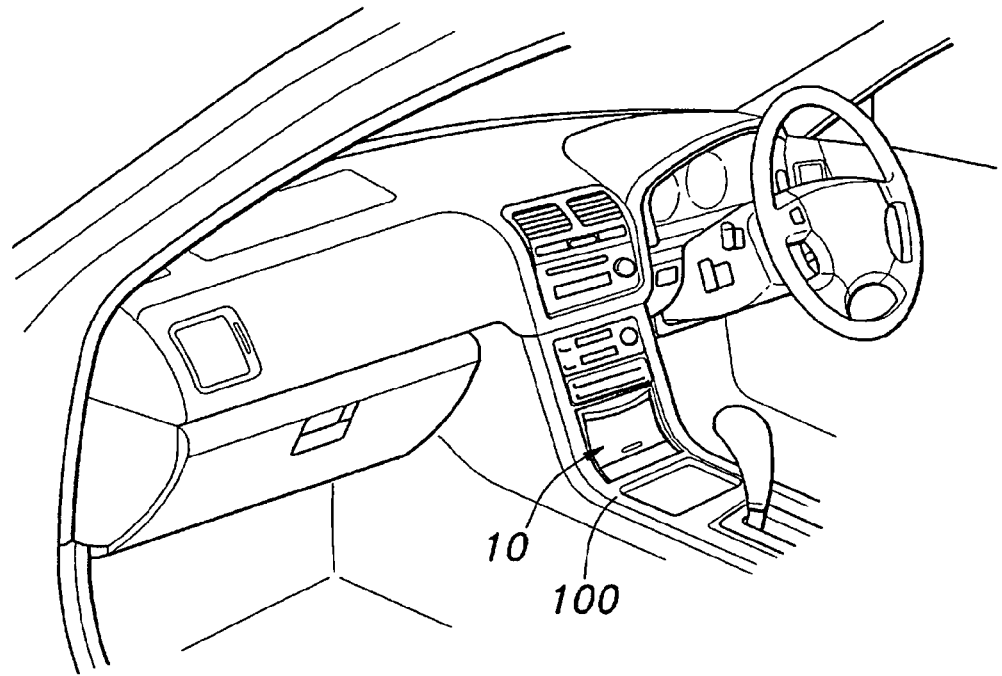
FIG. 1 is a perspective view of a driver's seat portion of a passenger vehicle showing an example of the application of a lid body opening and closing device according to the present invention.
Figure 2:
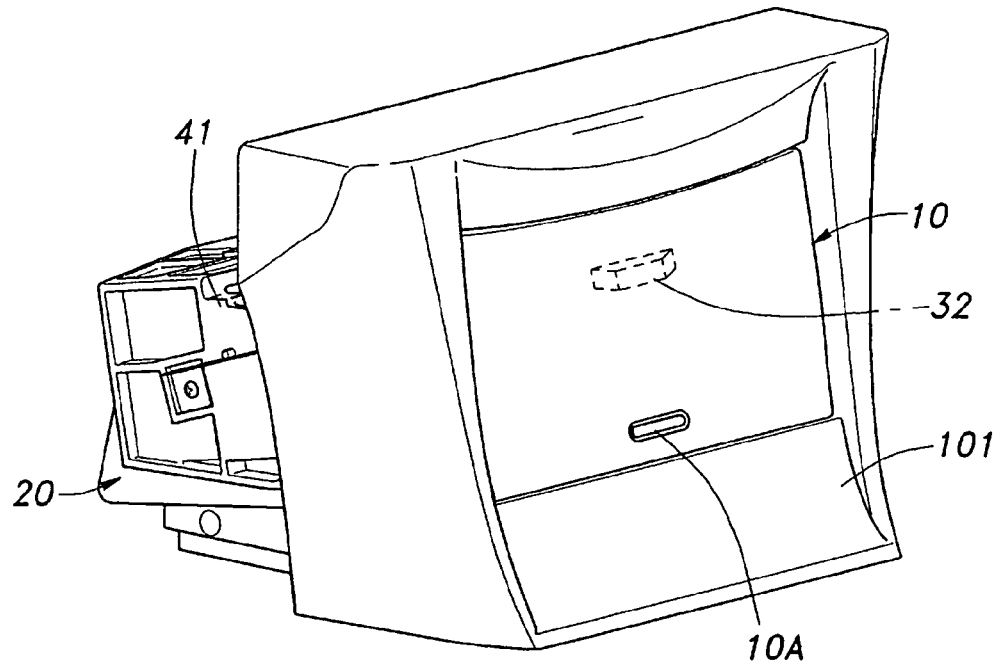
FIG. 2 is a perspective view showing a closed lid state of an embodiment 1 of the lid body opening and closing device according to the present invention.
Figure 3:
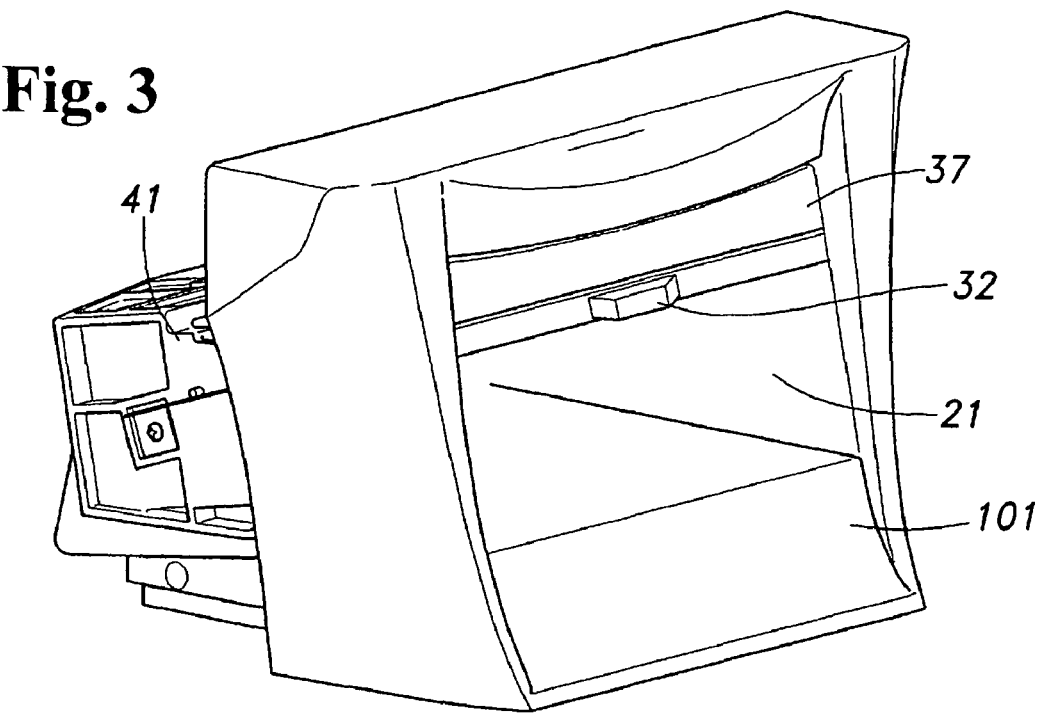
FIG. 3 is a perspective view showing an open lid stored state of the embodiment 1 of the lid body opening and closing device according to the present invention.
Figure 4:
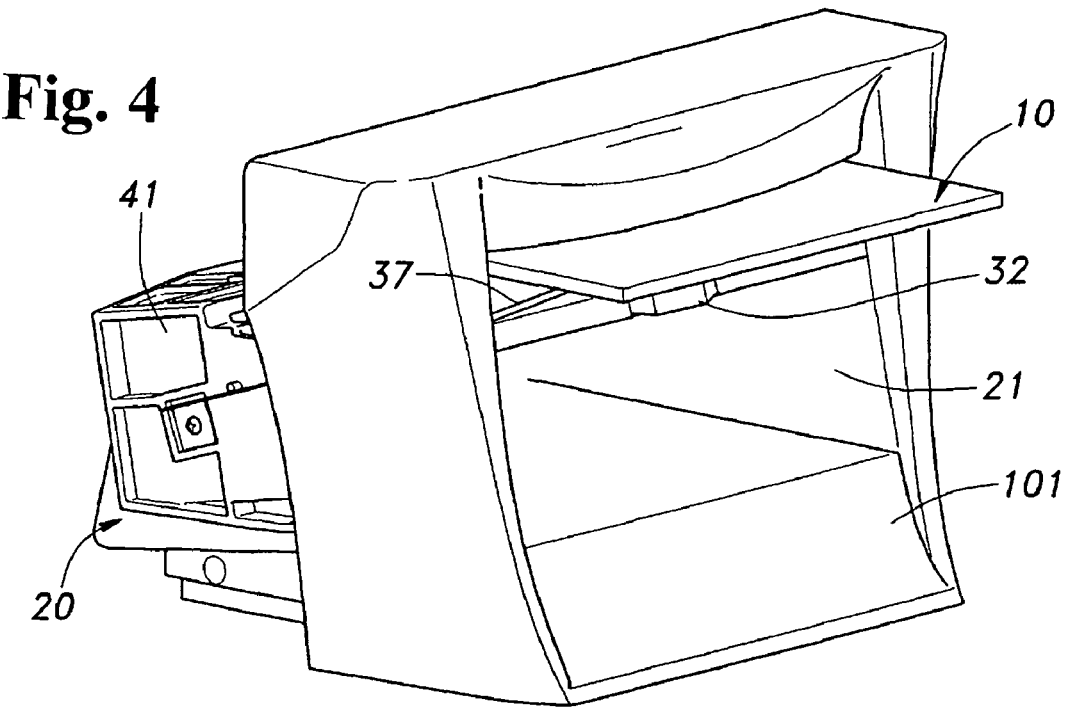
FIG. 4 is a perspective view showing a closing lid preparation state of the embodiment 1 of the lid body opening and closing device according to the present invention.
Figure 5:
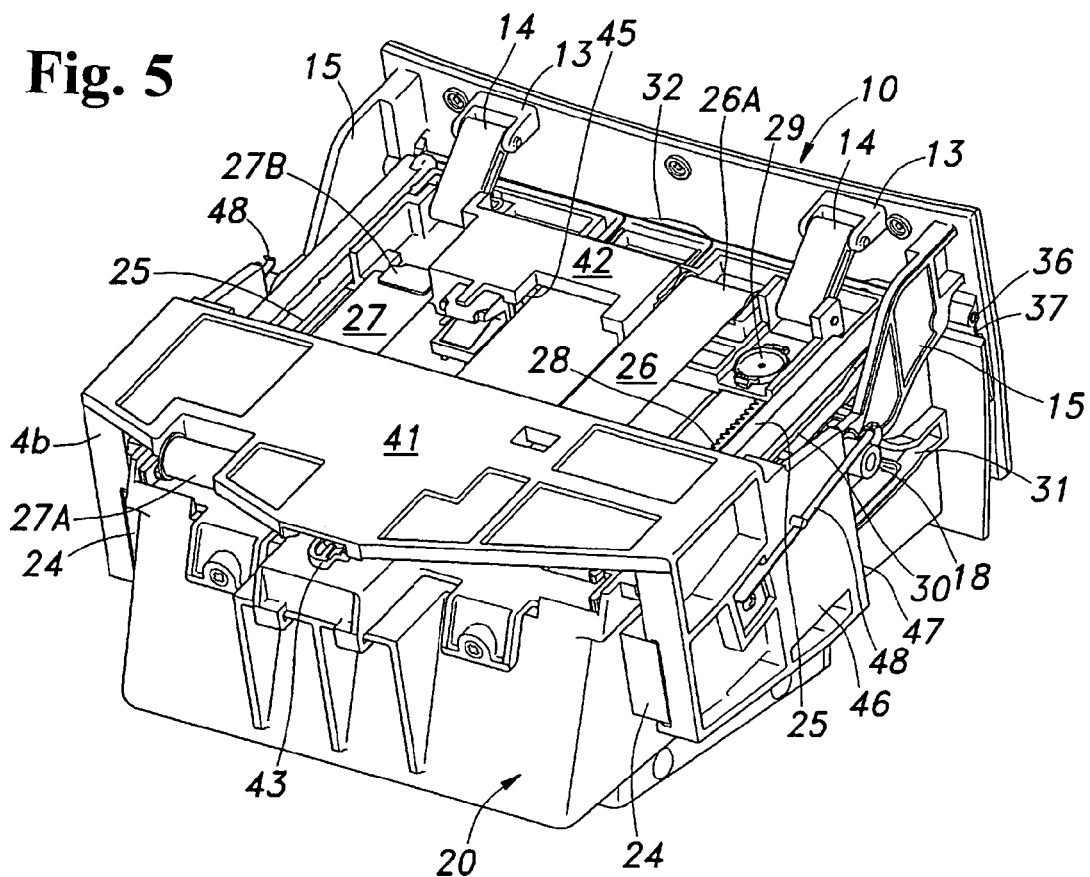
FIG. 5 is a perspective view of essential parts of the embodiment 1 of the lid body opening and closing device according to the present invention.
Figure 6:
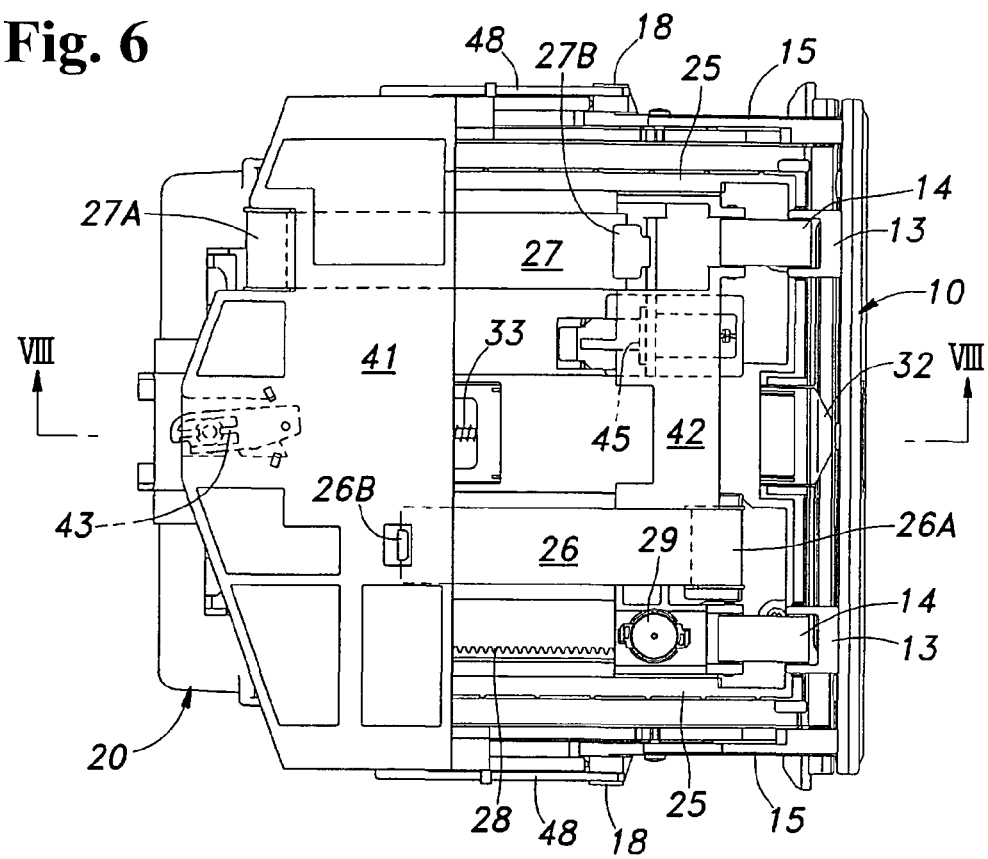
FIG. 6 is a plan view showing the closed lid state of the embodiment 1 of the lid body opening and closing device according to the present invention.
Figure 7:
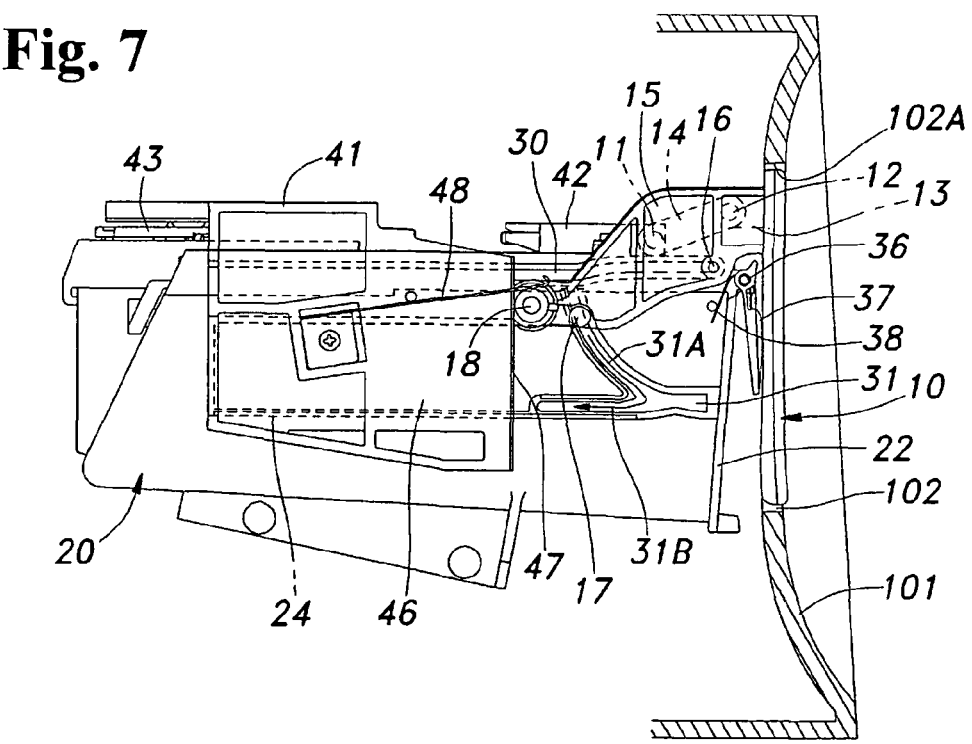
FIG. 7 is a side view showing the closed lid state of the embodiment 1 of the lid body opening and closing device according to the present invention.
Figure 8:
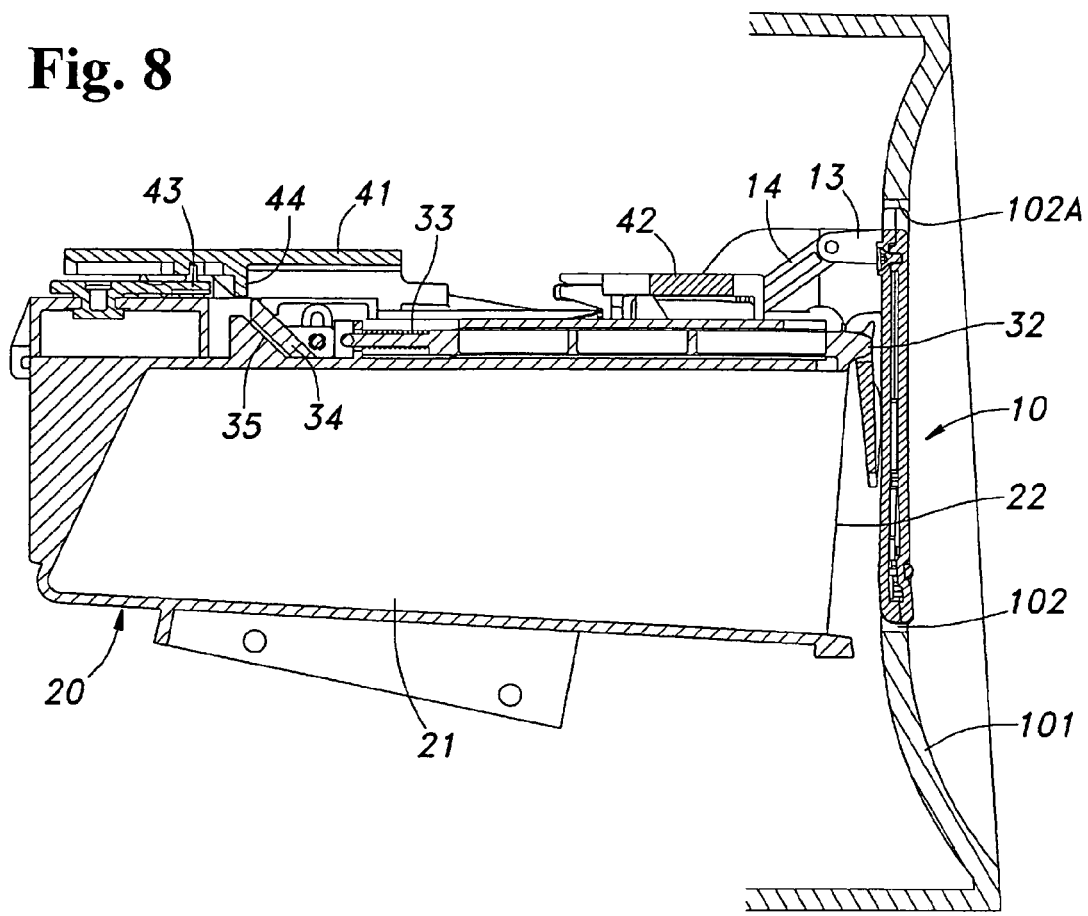
FIG. 8 is a cross sectional view taken along line VIII-VIII in FIG. 6.
Figure 9:
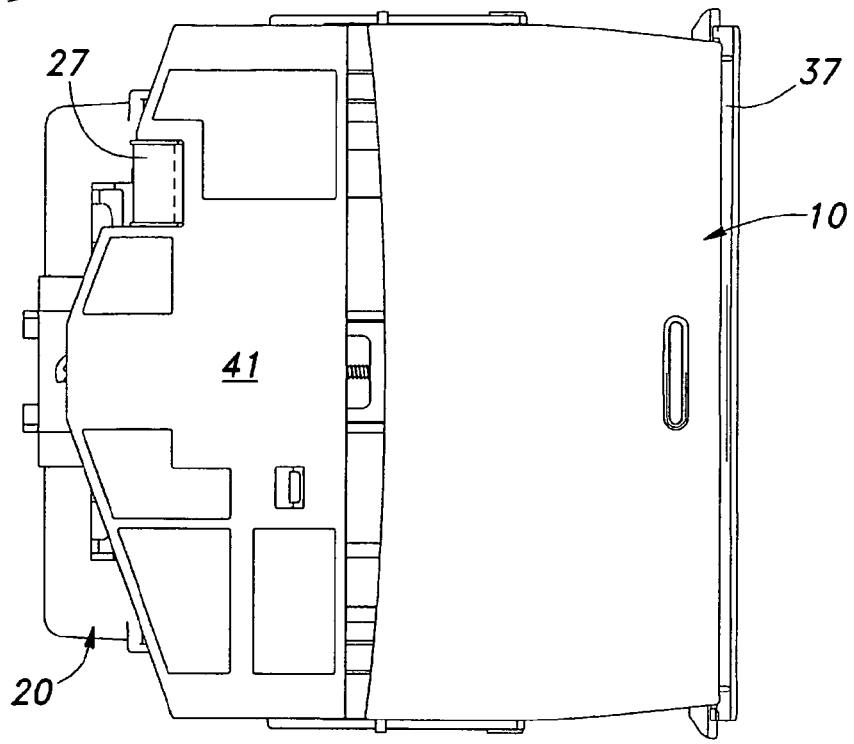
FIG. 9 is a plan view showing the open lid stored state of the embodiment 1 of the lid body opening and closing device according to the present invention.
Figure 10:
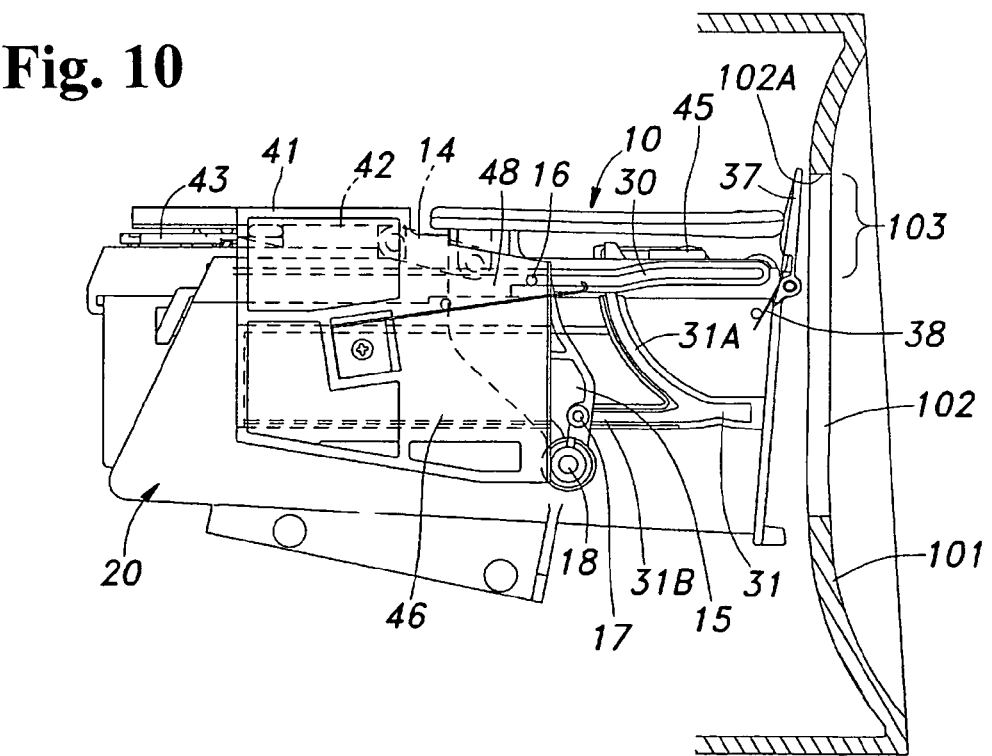
FIG. 10 is a side view showing the open lid stored state of an embodiment 1 of the lid body opening and closing device according to the present invention.
Figure 11:
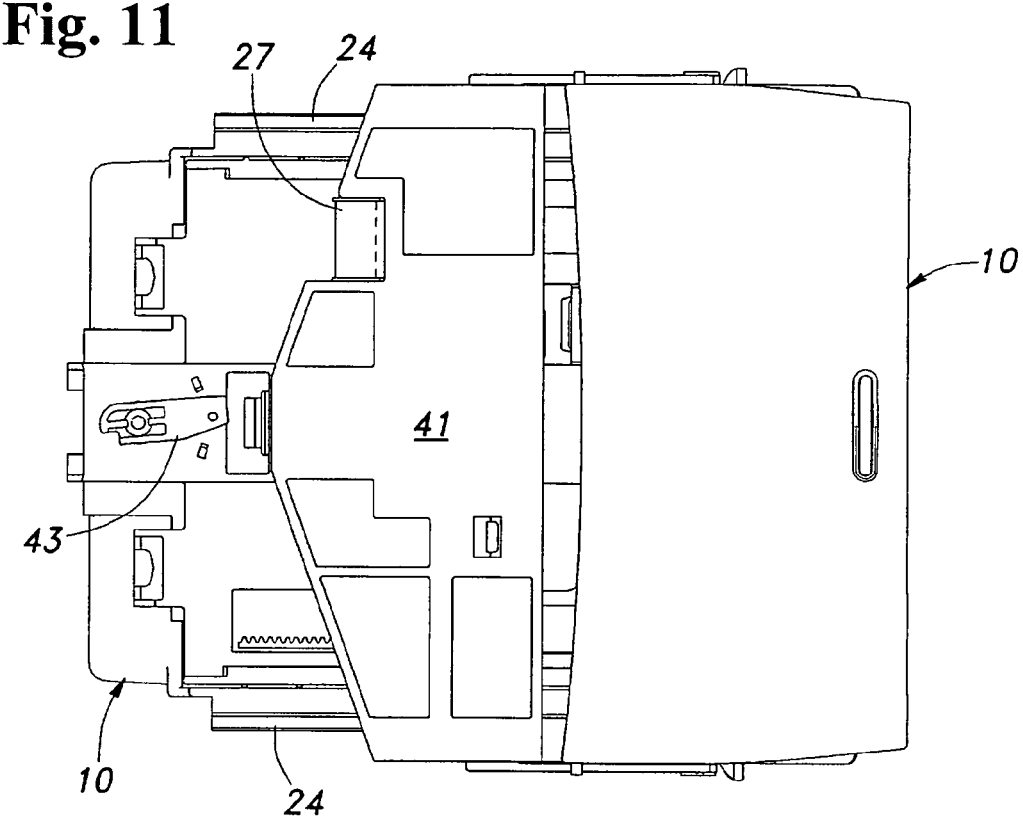
FIG. 11 is a plan view showing the closing lid preparation state of the embodiment 1 of the lid body opening and closing device according to the present invention.
Figure 12:
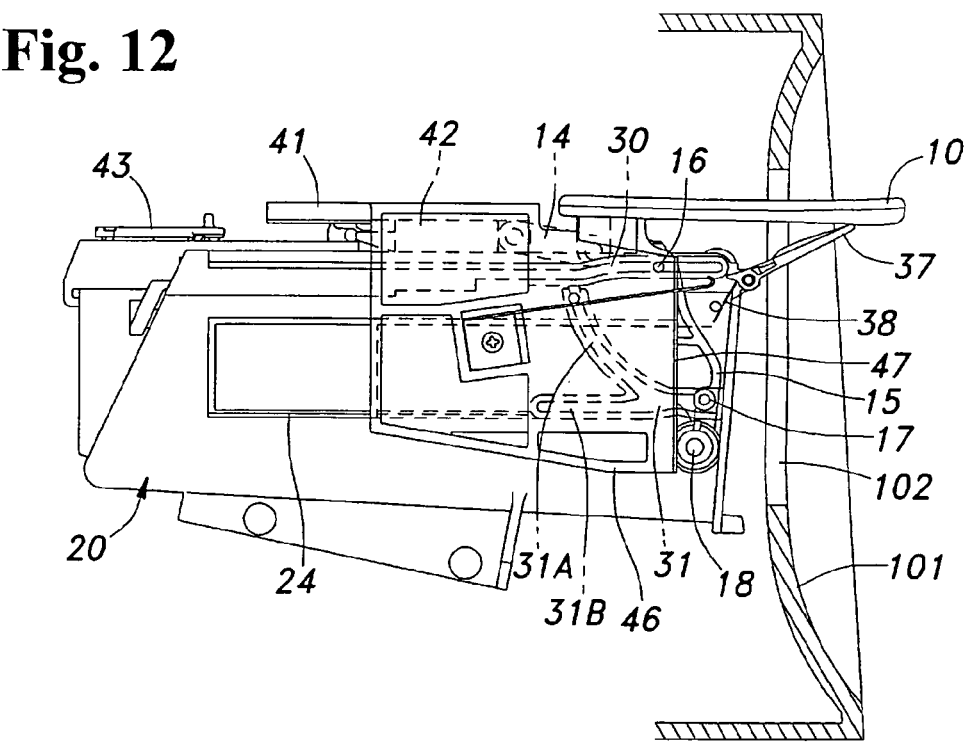
FIG. 12 is a side view showing the closing lid preparation state of the embodiment 1 of the lid body opening and closing device according to the present invention.
Figure 13:
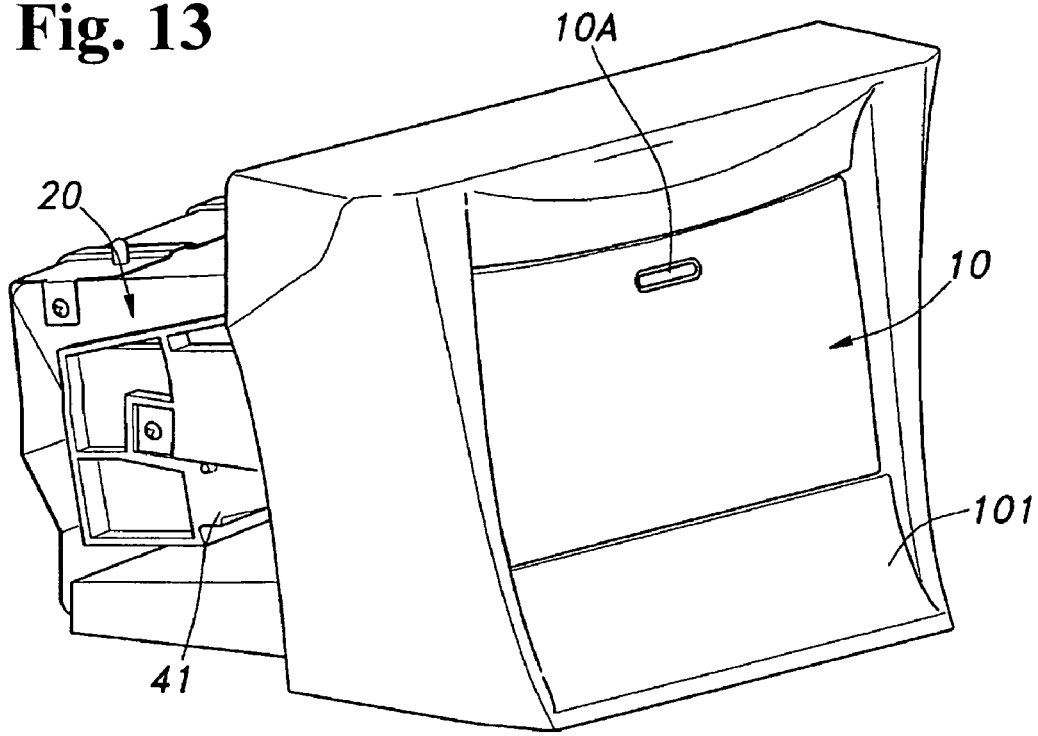
FIG. 13 is a perspective view showing the closed lid state of an embodiment 2 of the lid body opening and closing device according to the present invention.
Figure 14:
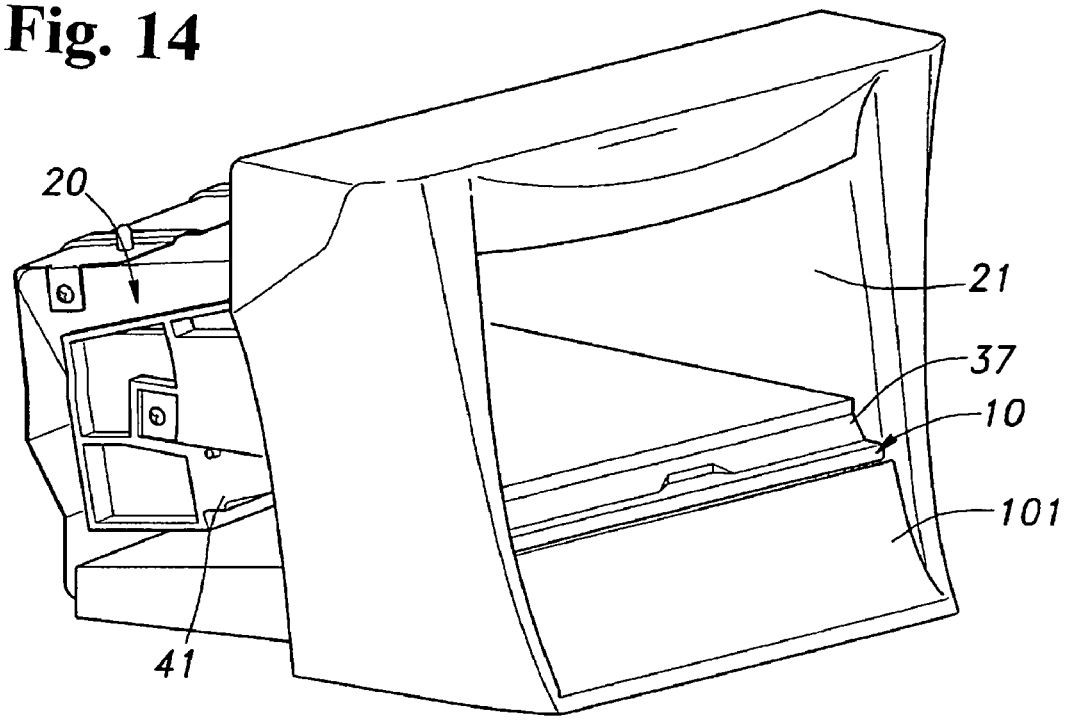
FIG. 14 is a perspective view showing the open lid stored state of the embodiment 2 of the lid body opening and closing device according to the present invention.
Figure 15:
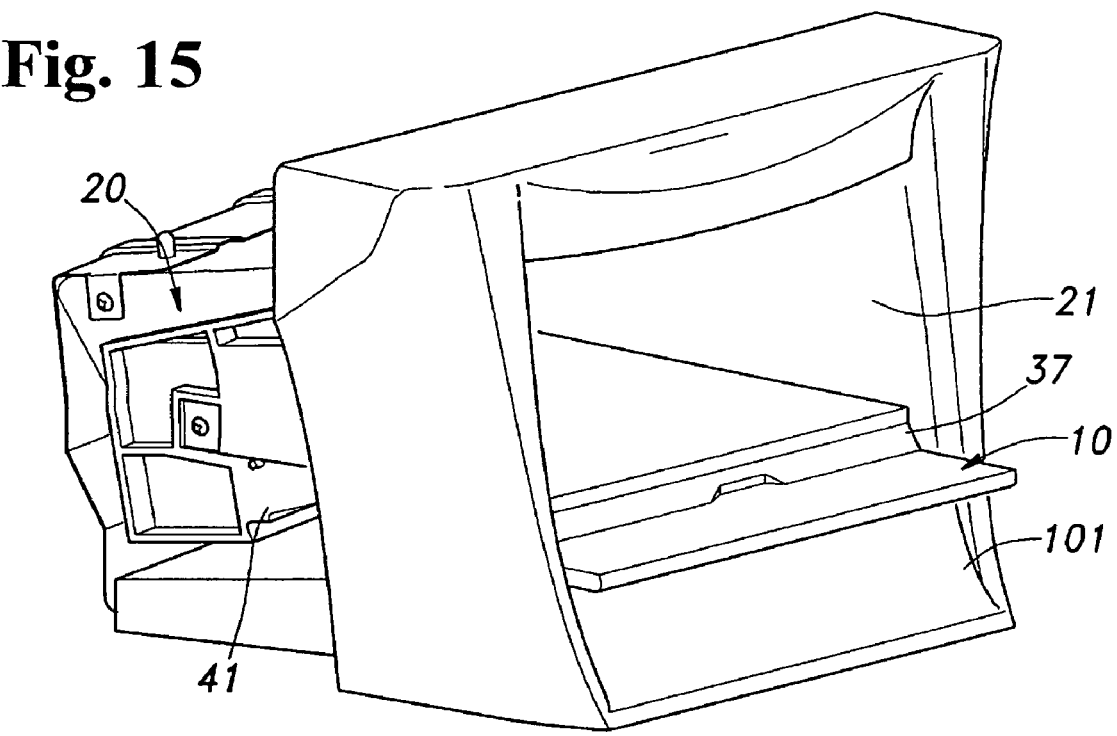
FIG. 15 is a perspective view showing the closing lid preparation state of the embodiment 2 of the lid body opening and closing device according to the present invention.
Figure 16:
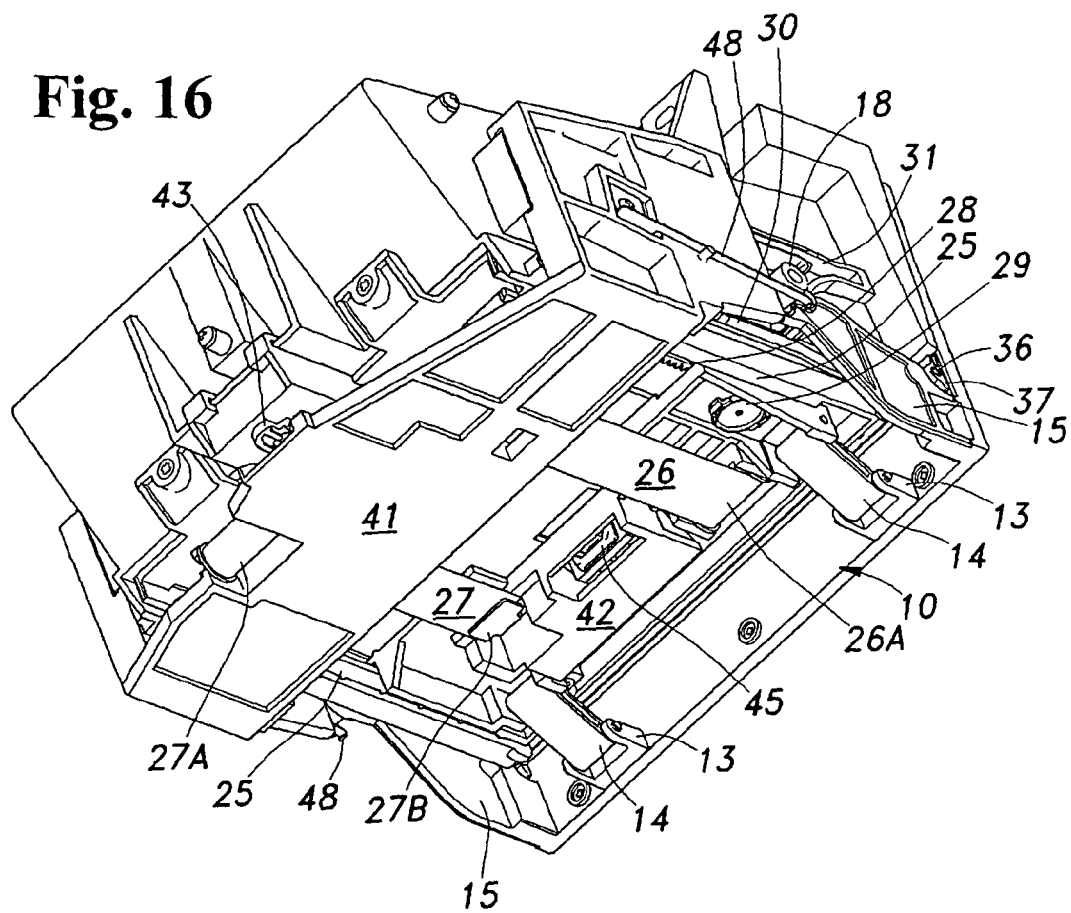
FIG. 16 is a perspective view of the essential parts of the embodiment 2 of the lid body opening and closing device according to the present invention.
Figure 17:
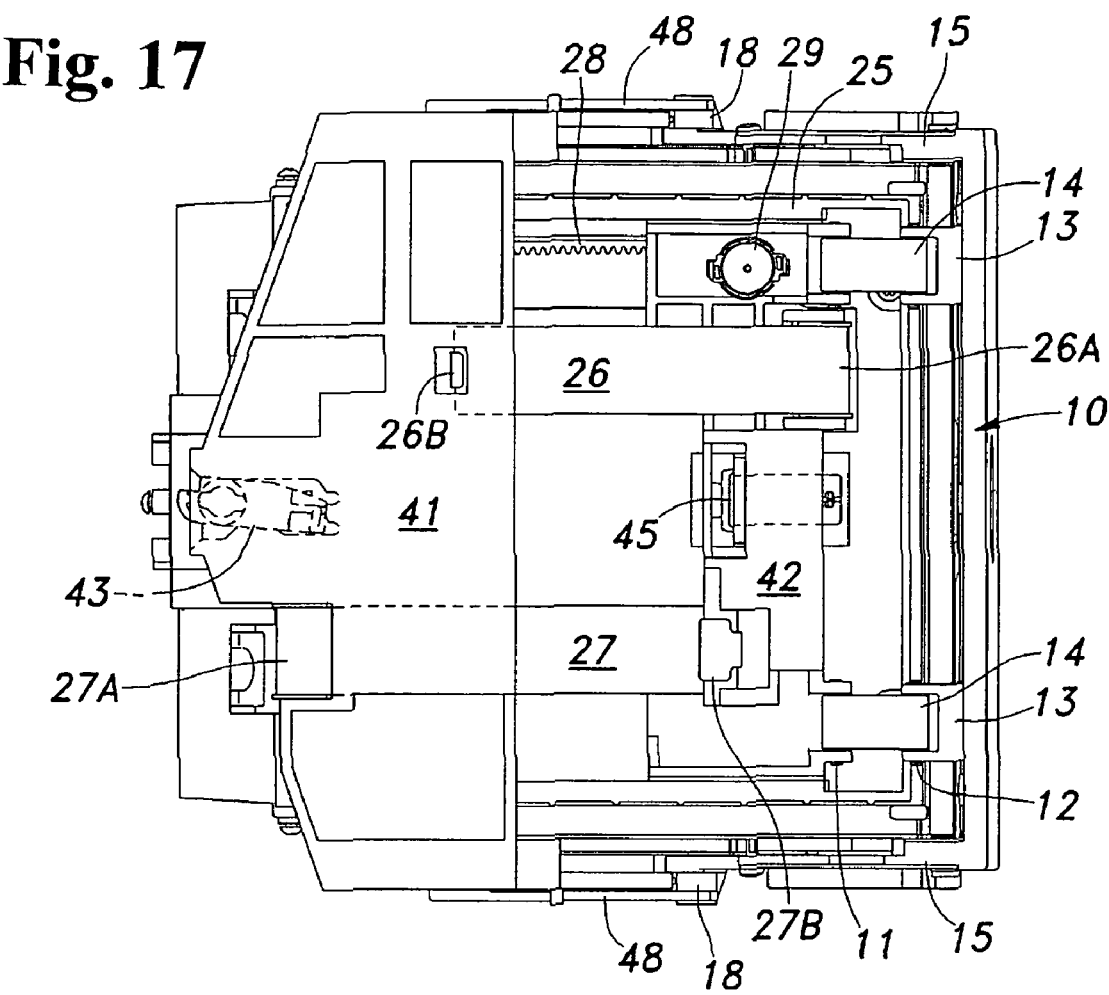
FIG. 17 is a bottom plan view showing the closed lid state of the embodiment 2 of the lid body opening and closing device according to the present invention.
Figure 18:
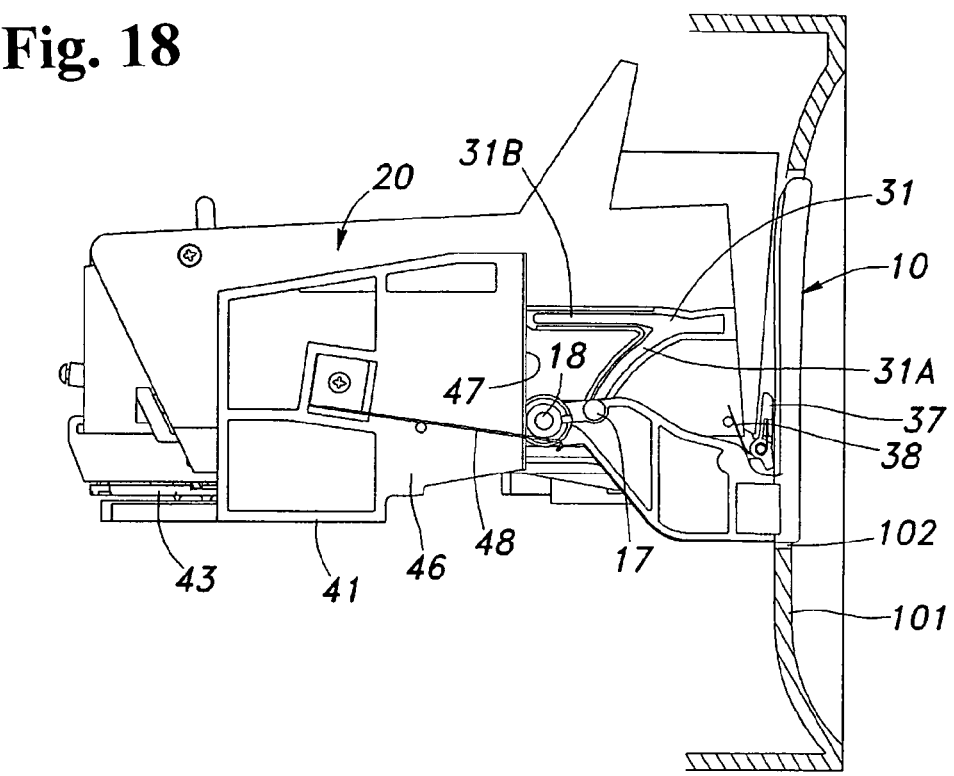
FIG. 18 is a side view showing the closed lid state of the embodiment 2 of the lid body opening and closing device according to the present invention.
Figure 19:
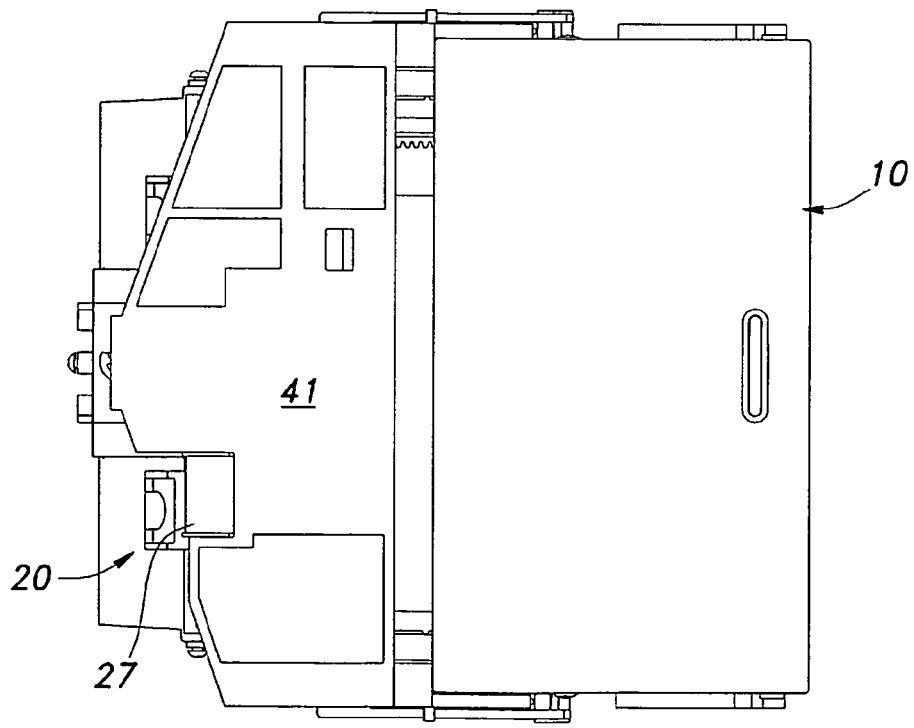
FIG. 19 is a bottom plan view showing the open lid stored state of the embodiment 2 of the lid body opening and closing device according to the present invention.
Figure 20:
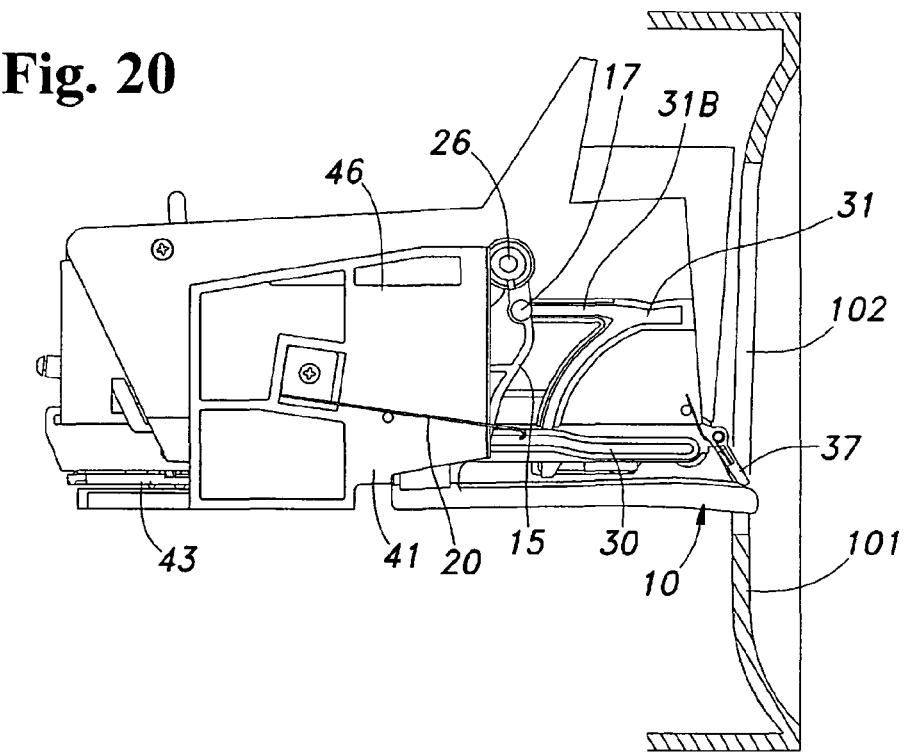
FIG. 20 is a side view showing the open lid stored state of the embodiment 2 of the lid body opening and closing device according to the present invention.
Figure 21:
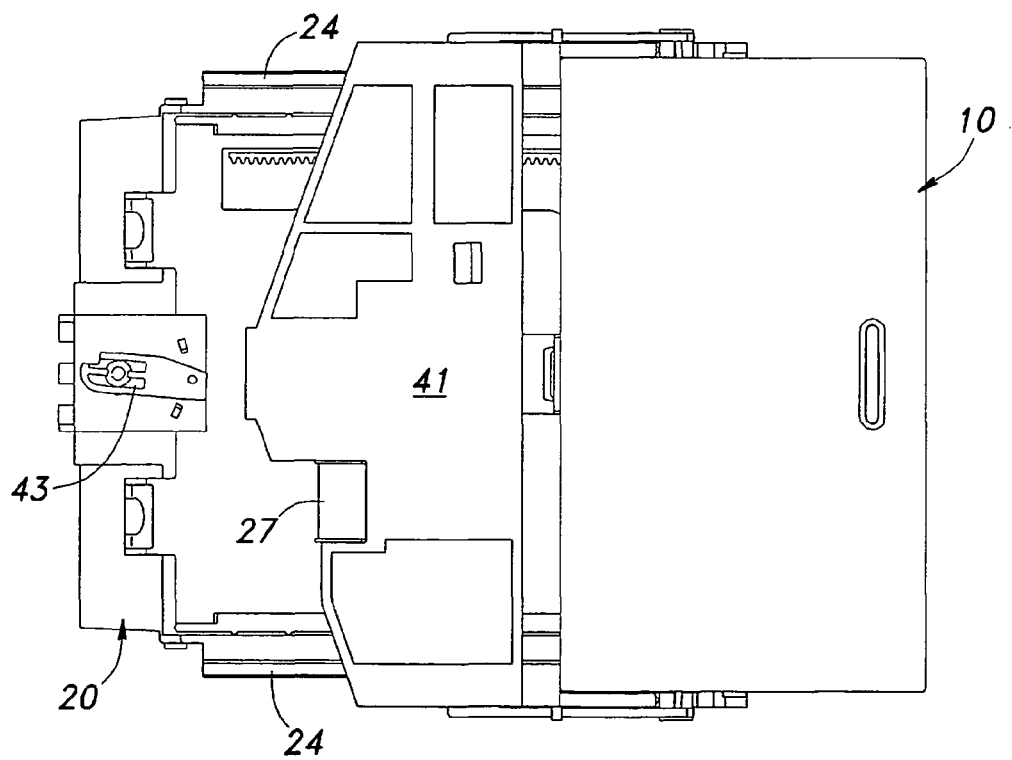
FIG. 21 is a bottom plan view showing the closing lid preparation state of the embodiment 2 of the lid body opening and closing device according to the present invention.
Figure 22:
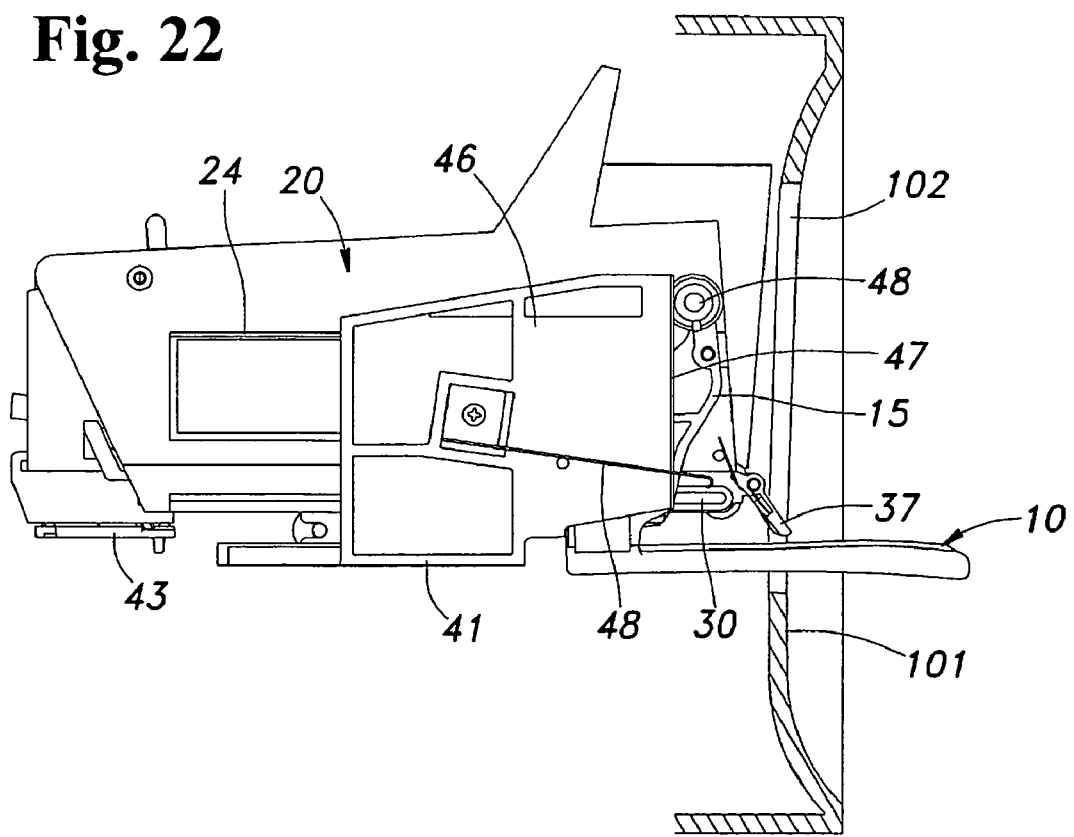
FIG. 22 is a side view showing the closing lid preparation state of the embodiment 2 of the lid body opening and closing device according to the present invention.

What is claimed is:

1. A storage compartment, comprising:
a housing having an opening portion;
an accessory panel having a penetration opening and disposed in front of said housing;

a lid body slidably attached to the housing to open and close the opening portion;

a first slider slidably provided in said housing in a front-back direction;

a second slider slidably provided in said housing in the front-back direction, and linked to said lid body;

a first spring member provided between said housing and said first slider and urging said first slider to a housing frontward side;

a second spring member provided between said first slider and said second slider, and urging said second slider to a housing backward side;

a first latch device releasably locking said first slider in a housing backward position relative to said housing; and a second latch device releasably locking said second slider in a housing frontward position relative to said housing;

wherein said lid body can selectively take a closed lid position closing said opening portion with an approximately vertical condition, and said lid body is fitted and disposed in said penetration opening; an open lid stored position wherein in the closed lid position, by releasing locking of said second slider by said second latch device, said second slider moves to the housing backward side by a spring force of said second spring member, so that said lid body is turned from the approximately vertical condition to an approximately horizontal condition, and moved to the housing backward side, and said lid body is entirely stored at a back of said accessory panel; and a closing lid preparation position wherein in the open lid stored position, by releasing locking of said first slider by said first latch device, said first slider moves to the housing frontward side together with the second slider by the spring force of said first spring member, so that the lid body in the approximately horizontal condition is pushed forward and projects to a housing front, and said lid body projects to a front of said accessory panel and is exposed.

2. The storage compartment according to claim 1, wherein said lid body in said closing lid preparation position is returned to the approximately vertical condition from the approximately horizontal condition, so that said first slider returns to the housing backward position against the spring force of said first spring member, and is locked relative to said housing by said first latch device, and said second slider returns to the housing frontward position against the spring force of said second spring member, and is locked relative to said housing by said second latch device, and said lid body is locked in said closed lid position.

3. The storage compartment according to claim 1, wherein said first latch device and said second latch device are respectively constituted by a latch mechanism with an alternate type of push-lock and push-open movements, and a pushing operation is performed by pushing a press button provided in said lid body or the front face portion of said housing.

4. The storage compartment device according to claim 1, further comprising a flapper which opens and closes a slit-like opening portion formed in order to take said lid body in and out of said open lid stored position, turnably provided between said housing and a border portion of said penetration opening of said accessory panel, wherein said flapper is urged to a closing position side by a flapper spring and abuts against said lid body, and with a movement of said lid body to said open lid stored position, said flapper turns to a closing position by a spring force of said flapper spring, and said lid body is moved to said closed lid position so that said flapper is turned to an opening position against the spring force of said flapper spring.

5. An opening and closing storage device, comprising:
a housing having an opening portion;
a lid body slidably attached to the housing to open and close the opening portion;
a first slider slidably provided in said housing in a front-back direction;
a second slider slidably provided in said housing in the front-back direction and linked to said lid body;
a first spring member provided between said housing and said first slider and urging said first slider to a housing frontward side;
a second spring member provided between said first slider and said second slider, and urging said second slider to a housing backward side;
arm members integrally provided respectively on both right and left sides of said lid body;
a first latch device releasably locking said first slider in a housing backward position relative to said housing;
a second latch device releasably locking said second slider in a housing frontward position relative to said housing;
first guide rail portions extending linearly in a front-back horizontal direction of said housing, one being provided on each side portion of the housing; and
second guide rail portions, each being formed on each side portion of the housing and comprising a circular arc portion and a horizontal linear portion extending linearly in the front-back horizontal direction of said housing and continuing to an end portion of said circular arc portion,
wherein each of said arm members comprises a first engaging element movably engaging said first guide rail portion, and a second engaging element movably engaging said second guide rail portion,
wherein said lid body is positioned in a closed lid position which closes said opening portion with an approximately vertical condition, and by releasing locking of said second slider by said second latch device, said second slider moves to the housing backward side by a spring force of said second spring member, and due to this movement, said second engaging element moves by being guided by said circular arc portion of said second guide rail portion so that said lid body in the closed lid position is turned around said first engaging element, and positioned in an approximately horizontal condition, so that the lid is opened, and further, said first engaging element is guided by said first guide rail portion, and also said second engaging element is guided by said horizontal linear portion of the second guide rail portion so that the first engaging element and the second engaging element respectively move to the housing backward side, so that said lid body moves to the housing backward side with the approximately horizontal condition and is positioned in an open lid stored position, and
wherein in a state wherein said lid body is positioned in said open lid stored position, the locking of said first slider by said first latch device is released, so that said first slider moves to the housing frontward side with said second slider by a spring force of said first spring member, and due to this movement, said first engaging element is guided by said first guide rail portion, and said second engaging element is guided by said horizontal linear portion of said second guide rail portion, so that the first engaging element and the second engaging element respectively move to the housing frontward side, and accordingly, said lid body is positioned in a closing lid preparation position wherein said lid body moves forward to the housing frontward side with the approximately horizontal condition, and projects to a housing front.

6. The opening and closing storage device according to claim 5, wherein said lid body in said closing lid preparation position is returned to the approximately vertical condition from the approximately horizontal condition, so that said first slider returns to the housing backward position against the spring force of said first spring member, and is locked relative to said housing by said first latch device, said second slider returns to the housing frontward position against the spring force of said second spring member, and is locked relative to said housing by said second latch device, and said lid body is locked in said closed lid position.

7. The opening and closing storage device according to claim 5, wherein said first latch device and said second latch device are respectively constituted by a latch mechanism with an alternate type of push-lock and push-open movements, and a pushing operation is performed by pushing a press button provided in said lid body or the front face portion of said housing.

8. The opening and closing storage device according to claim 5, further comprising an accessory panel disposed in front of said housing, and having a penetration opening, wherein said lid body in said closed lid position is fitted and disposed, a whole lid body in said open lid stored position is stored at a back of the accessory panel, and in said closing lid preparation position, said lid body projects to a front of said accessory panel and is exposed.

9. The opening and closing storage device according to claim 8, further comprising a flapper which opens and closes a slit-like opening portion formed in order to take said lid body in and out of said open lid stored position, turnably provided between said housing and a border portion of said penetration opening of said accessory panel, wherein said flapper is urged to a closing position side by a flapper spring and abuts against said lid body, and with a movement of said lid body to said open lid stored position, said flapper turns to the closing position by a spring force of said flapper spring, and said lid body is moved to said closed lid position so that said flapper is turned to an opening position against the spring force of said flapper spring.

* * * * *